United States Patent
Linzer

(10) Patent No.: US 7,400,683 B2
(45) Date of Patent: Jul. 15, 2008

(54) DEVICE WITH VIRTUAL TILIZED IMAGE MEMORY

(75) Inventor: Elliot N. Linzer, Suffern, NY (US)

(73) Assignee: LSI Corporation, Milpitas, CA (US)

(*) Notice: Subject to any disclaimer, the term of this patent is extended or adjusted under 35 U.S.C. 154(b) by 910 days.

(21) Appl. No.: 10/716,222

(22) Filed: Nov. 18, 2003

(65) Prior Publication Data

US 2005/0105623 A1   May 19, 2005

(51) Int. Cl.
   *H04N 7/12* (2006.01)
(52) U.S. Cl. .............................. 375/240.25
(58) Field of Classification Search ............ 348/384, 348/716, 717, 718, 700, 413, 415, 394, 416, 348/699, 409, 412, 402, 405, 419, 420, 715, 348/396, 395, 397, 714, 719; 382/232, 233, 382/234, 236, 237, 238, 239, 302, 303, 304, 382/305, 235; 375/240.25, 240.01, 240.12, 375/240.16, 240.18

See application file for complete search history.

(56) References Cited

U.S. PATENT DOCUMENTS

| | | | |
|---|---|---|---|
| 4,862,264 A | | 8/1989 | Wells et al. |
| 5,301,288 A | * | 4/1994 | Newman et al. ............ 711/202 |
| 5,585,863 A | * | 12/1996 | Hackett et al. ............. 348/716 |
| 5,668,599 A | * | 9/1997 | Cheney et al. ............. 348/402 |
| 5,675,387 A | * | 10/1997 | Hoogenboom et al. . 375/240.15 |
| 5,717,441 A | | 2/1998 | Serizawa et al. |
| 5,835,952 A | | 11/1998 | Yamauchi et al. |
| 5,900,865 A | * | 5/1999 | Howe ......................... 345/572 |
| 5,903,669 A | | 5/1999 | Hirabayashi |
| 5,920,352 A | * | 7/1999 | Inoue ......................... 348/384 |
| 6,104,416 A | | 8/2000 | McGuinness |
| 6,301,299 B1 | * | 10/2001 | Sita et al. ............... 375/240.01 |
| 7,015,918 B2 | * | 3/2006 | Linzer et al. ................ 345/537 |
| 7,016,418 B2 | * | 3/2006 | Wang et al. ............ 375/240.24 |
| 7,206,347 B2 | * | 4/2007 | Lim et al. .............. 375/240.25 |
| 2002/0109699 A1 | | 8/2002 | Champion et al. |

* cited by examiner

*Primary Examiner*—Tung Vo
*Assistant Examiner*—Behrooz Senfi
(74) *Attorney, Agent, or Firm*—Christopher P. Maiorana, P.C

(57) ABSTRACT

A device generally having a memory manager and a direct memory access unit. The memory manager may be configured to (i) map a first picture from a video signal among a plurality of picture segments and (ii) generate a list associating each of the picture segments to a plurality of physical pages in a memory. The direct memory access unit may be configured to store the first picture among the physical pages according to the list and the mapping.

20 Claims, 5 Drawing Sheets

DEVICE WITH VIRTUAL TILIZED IMAGE MEMORY

FIELD OF THE INVENTION

The present invention relates to a digital video decoding generally and, more particularly, to a method and/or device with a virtual tilized image memory.

BACKGROUND OF THE INVENTION

Compression of digital video data is used for many applications including, but not limited to, transmission over bandwidth-constrained channels, such as direct broadcast satellite and storage on optical media. In order to achieve very efficient compression, complex, computationally intensive processes are used for encoding (compressing) and decoding (decompressing) video. For example, though MPEG-2 (Moving Pictures Expert Group, International Organization for Standards, Geneva, Switzerland) is known as a very efficient method for compressing video, a new, more efficient standard, H.264 ("Advanced Video Coding", International Telecommunication Union Telecommunication Standardization Sector, Geneva, Switzerland), is being developed.

The H.264 standard allows for bitstreams that (i) use a large number of reference frames to reconstruct a single picture and (ii) use reordering schemes that transmit many "future frames" with later display times then a current picture before the current picture is transmitted. By contrast, MPEG-1 and MPEG-2 allow for at most two reference frames for reconstructing a picture and only a single future frame.

Referring to FIG. 1, a diagram illustrating a conventional bitstream 10 that uses many reference frames is shown. In the illustration, a group of pictures (frames) having six pictures is represented by one I-frame 12 followed by five P-frames 14a-14e. The arrows show how reference frames are used for prediction. Each P-frame 14a-14e after the I-frame 12 uses all of the previous frames in the group of pictures as references, so that the last frame 14e has five reference frames 12 and 14a-14d.

Referring to FIG. 2, a diagram illustrating a bit stream 16 that uses many "future frames" is shown. The bit stream 16 is shown in display order, with arrows showing how reference frames are used for prediction. Like the groups of pictures often used for MPEG-1 or MPEG-2, (i) each P-frame is predicted from one I-frame or one P-frame and (ii) each B-frame is predicted from two frames, each an I-frame or a P-frame. However, the H.264 standard allows the I-frame to be a frame displayed in the middle of the group of pictures. The frames displayed before the I-frame are predicted in the opposite direction as usual; the P-frames before the I-frame use backward only, instead of forward only, prediction. Thus, the I-frame needs to be transmitted first but is displayed tenth. Depending on the order of B-frame transmission (i.e., if the B-frames displayed before the I-frame are transmitted in display order, backwards display order, or something else), the decoder will need to buffer 5-10 frames to decode and display the bitstream.

The flexible approach permitted by the H.264 standard for creating bitstreams results in the decoder buffering a large amount of image data. To limit the amount of memory that a decoder reasonably uses for decoding, the H.264 places two constraints on the bitstreams (i) a bitstream cannot be constructed so that the total number of bytes of decompressed pictures buffered at the decoder exceeds a limit B and (ii) a bitstream cannot be constructed so that the total number of decompressed frames buffered at the decoder exceeds a limit F. For example, for a level 4 (high definition) stream, at any time, the decoder will never hold more than sixteen frames or any number of frames that use more than 12,288×1024 bytes in total.

The H.264 standard allows for a resolution of compressed pictures in a single bitstream to change. Thus, the maximum number of frames buffered over time will vary with the resolution of the frames. When low-resolution frames are used, many frames are commonly buffered. When high-resolution frames are used, few frames are commonly buffered.

If memory is accessed through register read-write instructions using virtual linear memory, the total amount of memory that a decoder will allocate for decoded pictures is roughly the nominal limit given by the H.264 standard (i.e., 12,288 kilobytes (KBytes) for level 4). In practice an actual decoder uses slightly more memory when not operating exactly according to the principles of the H.264 reference decoder. For example, an extra delay between decoding and display introduced for scaling and other display processing consumes additional memory.

A conventional video decoder allocates physically contiguous buffers for the maximum number of frames used for decoding times the maximum size of each frame. The buffers are used for storing frames as the frames are decoded and freed when the frames are no longer needed (i.e., the frames that have been displayed and will no longer be used as references for other frames). The conventional approach will use much more memory than a nominal amount of memory if the number of frames to be buffered depends on the resolution of the frames.

SUMMARY OF THE INVENTION

The present invention concerns a device generally comprising a memory manager and a direct memory access unit. The memory manager may be configured to (i) map a first picture from a video signal among a plurality of picture segments and (ii) generate a list associating each of the picture segments to a plurality of physical pages in a memory. The direct memory access unit may be configured to store the first picture among the physical pages according to the list and the mapping.

The objects, features and advantages of the present invention include providing a method and/or device that accesses a virtual tilized image memory that may (i) access utilizes direct memory access operations, (ii) store each frame as a multiplicity of buffers or segments, (iii) implement an allocation and free mechanism to reuse the same segments for pictures of different sizes, (iv) generate a pointer list is kept to map locations of pixels in a frame to physical locations in the memory of the segments, (v) use less memory than conventional designs and/or (vi) cost less than conventional designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
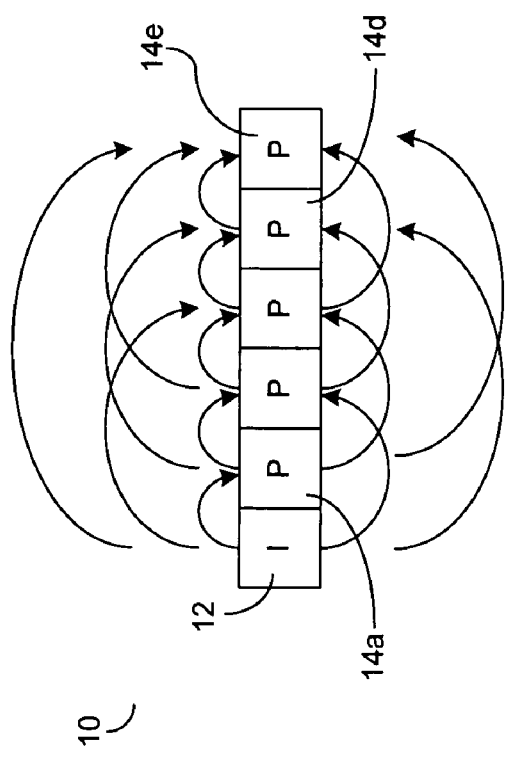
FIG. 1 is diagram illustrating a conventional bitstream that uses many reference frames.
Figure 2:
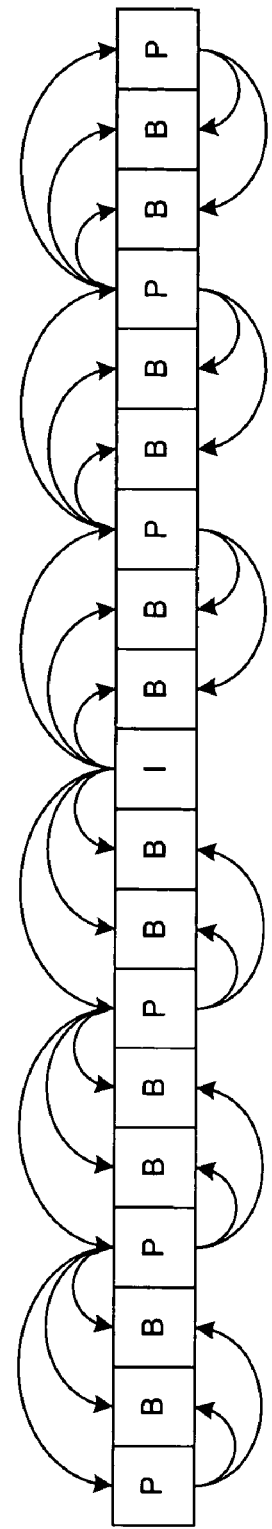
FIG. 2 is a diagram illustrating a bit stream that uses future frames.
Figure 3:
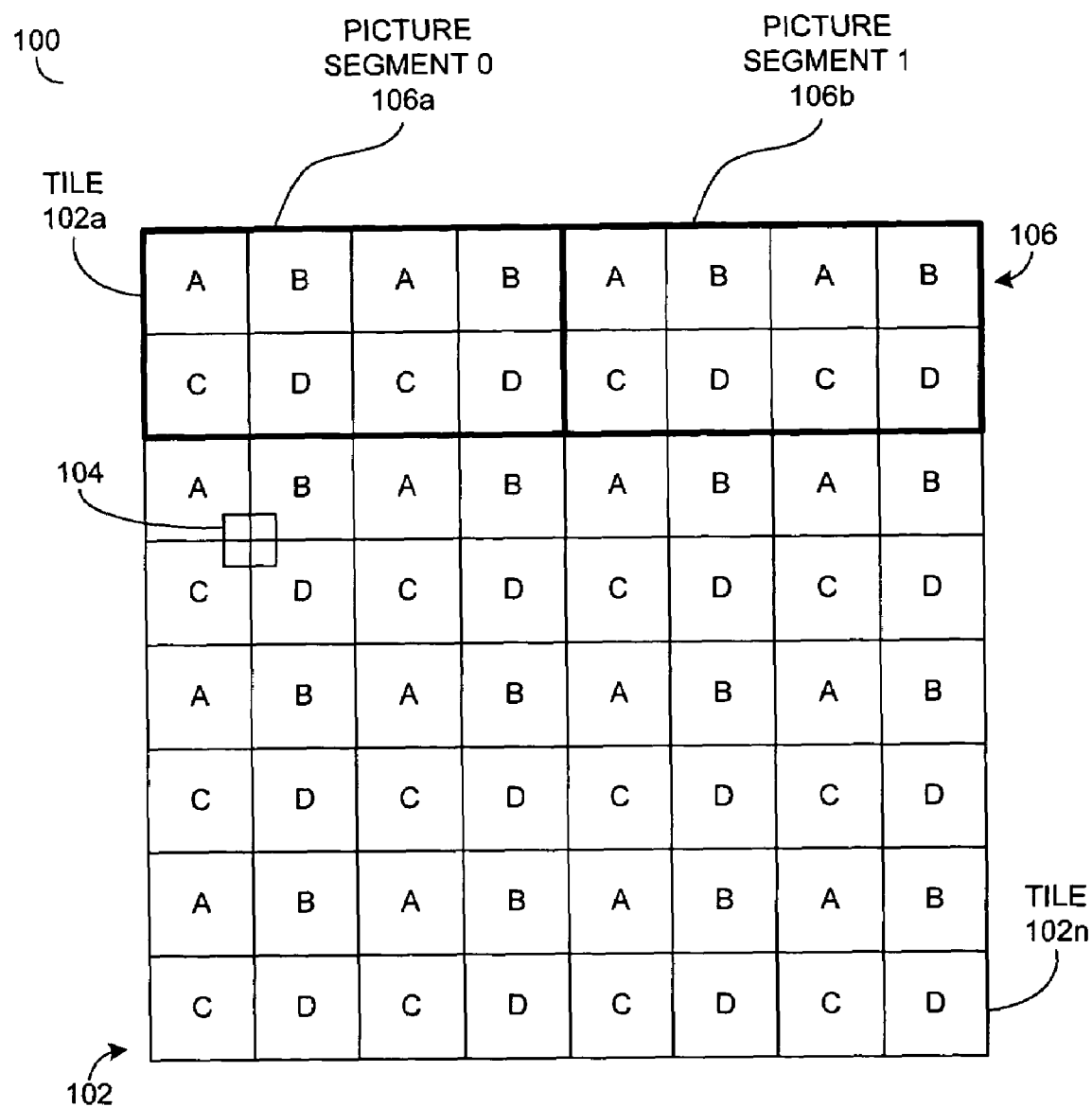
FIG. 3 is a block diagram of a portion of a picture.
Figure 5:
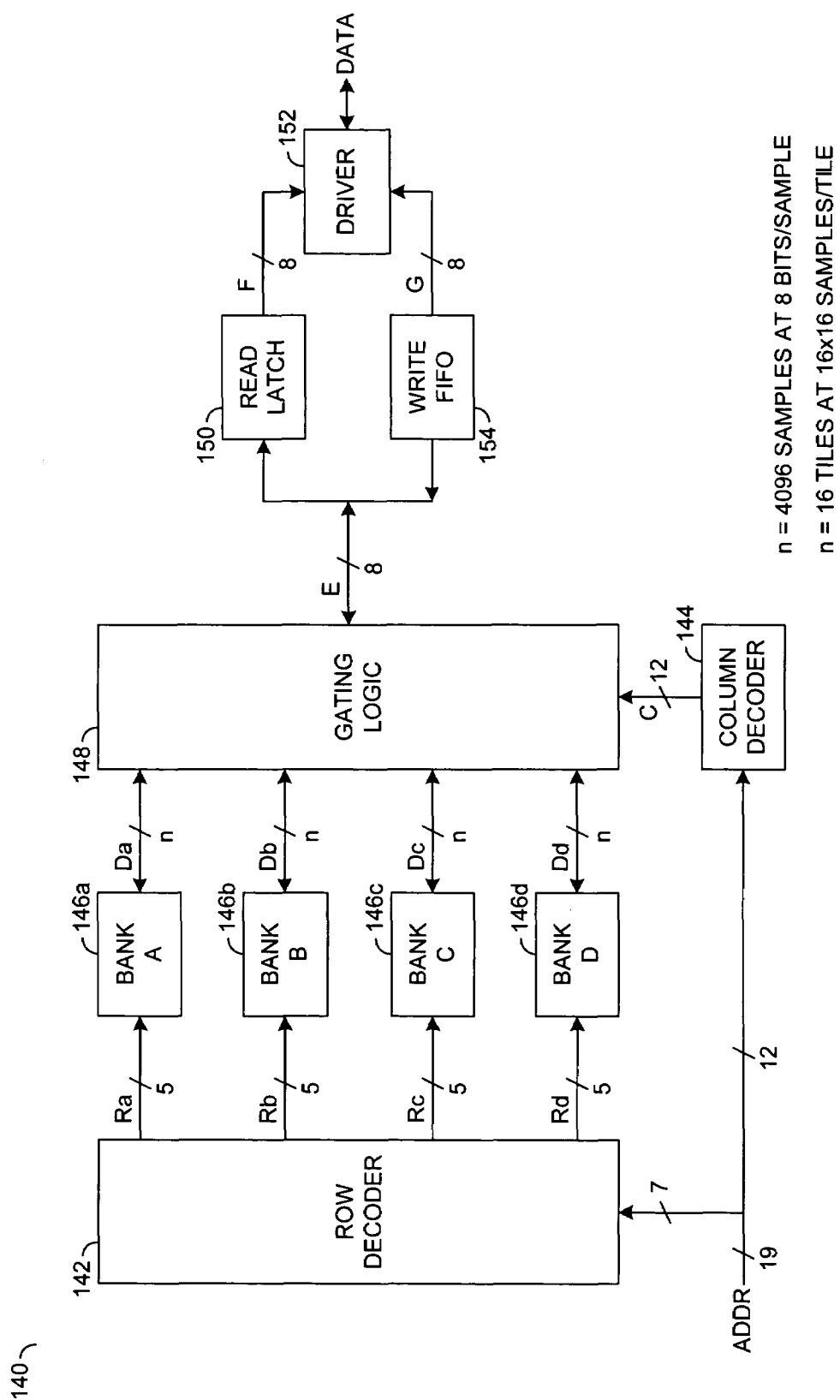
FIG. 5 is a block diagram of an example implementation of an external memory circuit.

Referring to FIG. 3, a block diagram of a portion of a picture (or image) 100 is shown. The picture 100 may be divided into multiple "tiles" 102a-102n (generically referred to as tiles 102). Each of the tiles 102 may be stored in an external memory (FIG. 5). The external memory generally comprises multiple banks (e.g., A-D), wherein each bank A-D comprises multiple pages and each page is sized to store multiple samples (e.g., luminance components or chrominance components of pixels). For example, a tile 102a may correspond to bank A and a tile 102n may correspond to bank D of the external memory. The tiles 102 may be related to the banks A-D to form a repeated pattern wherein each group of four tiles 102 sharing a common corner includes each bank A-D once.

Dividing the picture 100 into the tiles 102 generally improves the external memory bandwidth efficiency for a video decoder system that generates many random accesses to small blocks (e.g., block 104 within the picture 100). Specifically, the picture 100 may be broken up into spatially rectangular regions (e.g., the tiles 102), each of which is stored in contiguous ranges in the external memory. Typically, a size of each tile 102 is similar or identical to a page size for each bank A-D. In practice, the page size is typically 1 to 8 KBytes. As such, transferring the small block 104 to or from the external memory will in general access at most four unique pages, a single page from each of the banks A-D. Moreover, by rotating the usage of the banks A-D to tiles 102, a transfer of the small block 104 will typically touch at most one page from each of the several memory banks A-D.

Multiple tiles 102 may be logically and/or physically grouped together. Each group (e.g., 106a-106b) may be referred to as a picture segment, or segment for short (generically referred to as picture segments 106). For example, a first picture segment 0 (e.g., 106a) may include eight tiles 102, two tiles 102 mapped to bank A, two tiles 102 mapped to bank B, two tiles 102 mapped to bank C and two tiles 102 mapped to bank D. In general, each picture segment 106 may include one or more tiles 102 mapped to each of the memory banks in the external memory.

Figure 4:
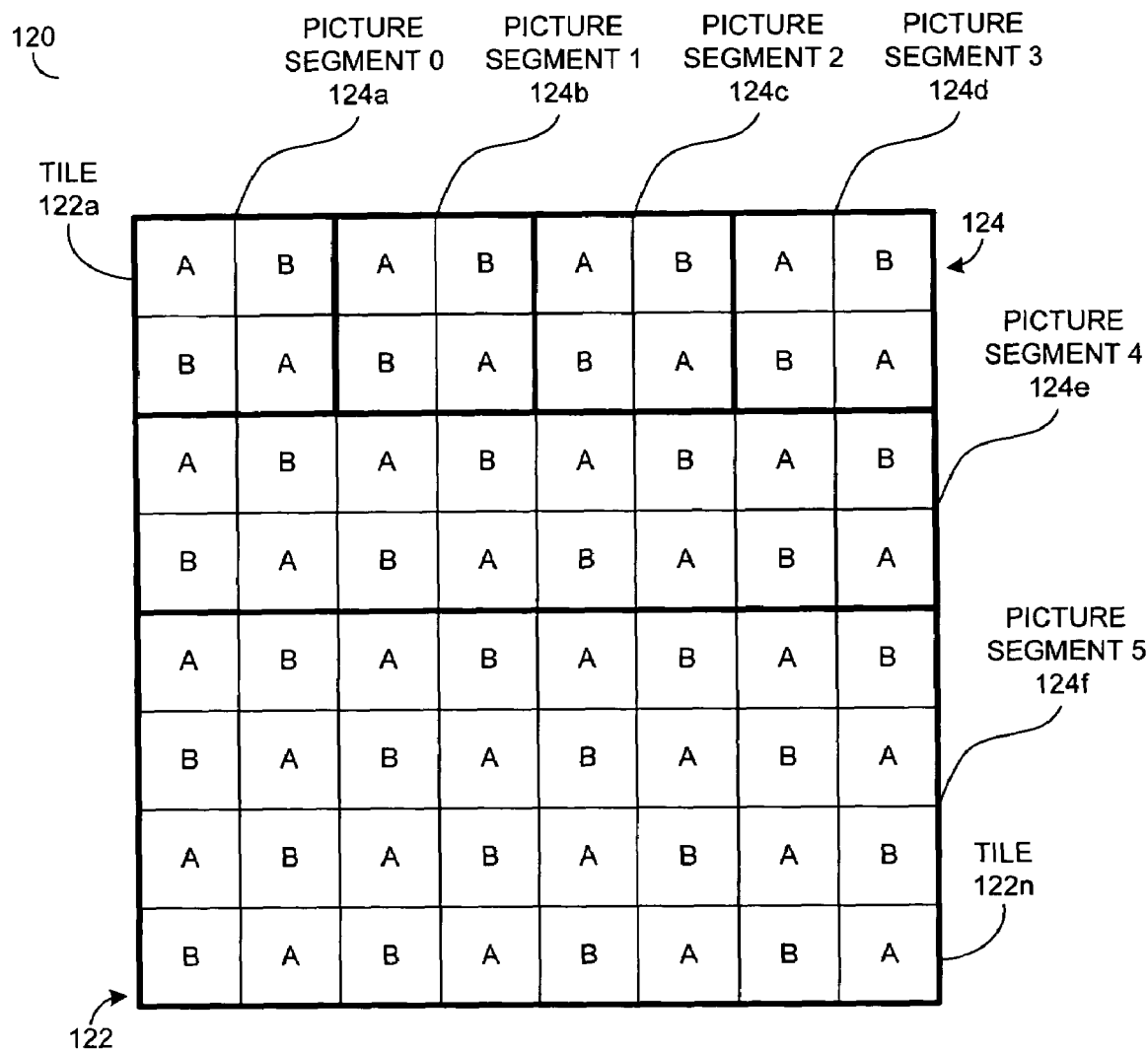
FIG. 4 is a block diagram of a portion of another picture.

Referring to FIG. 4, a block diagram of a portion of another picture (or image) 120 is shown. The picture 120 may be allocated among multiple tiles 122a-122n (generically referred to as tiles 122). The tiles 122 may be similar to the tiles 102 (FIG. 3). Samples within the tiles 122 may be stored in an external memory having two banks A-B. Other numbers of banks within the external memory may be implemented to meet the criteria of a particular application.

The tiles 122 may be arranged as several picture segments 124a-124f. Some of the picture segments (e.g., 124a-124d) are generally illustrated as having similar sizes and arrangements. Other picture segments (e.g., 124e and 124f) may illustrate mixed sizes and arrangements within the picture 120. For example, each of the picture segments 124a-124d generally includes four of the tiles 122 in a square arrangement. Each of the picture segments 124a-124d may have two tiles 122 mapped to the bank A of the external memory and two tiles 122 mapped to the bank B. The picture segment 124e may comprise 16 of the tiles 122 in a rectangular arrangement. Half of the tiles 122 in the picture segment 124e may be mapped to the bank A and the other half mapped to the bank B. An allocation of the tiles 122 to the banks A-B may be in a checkerboard pattern. The picture segment 124f may comprise 32 tiles 122 in a rectangular arrangement. Half of the tiles 122 in the picture segment 124f may be mapped to the bank A and the other half mapped to the bank B, also in the checkerboard pattern. The tiles 122 may be allocated among picture segments 124 all having similar sizes and arrangements or among picture segments 124 having different sizes and arrangements in different areas of the picture 120.

Referring to FIG. 5, a block diagram of an example implementation of an external memory circuit 140 is shown. The external memory circuit 140 generally comprises a block (or module) 142, a block (or module) 144, multiple banks 146a-146d, a block (or module) 148, a block (or module) 150, a block (or module) 152 and a block (or module) 154. An address signal (e.g., ADDR) may be received by the external memory circuit 140. A data signal (e.g., DATA) may be transferred to and from the external memory circuit 140.

The block 142 may be implemented as a row decode block. The row decode block 142 may receive a portion of the signal ADDR corresponding to an addressed row or page of memory. The row decode block 142 may generate multiple signals (e.g., Ra-Rd) to access a particular row from one of the banks 146a-146d.

The block 144 may be implemented as a column decode block. The column decode block 144 may receive a portion of the signal ADDR corresponding to an addressed column of memory. The column decode block 144 may generate a signal (e.g., C) to access a particular column from the page accessed by the row decode block 142.

Each of the banks 146a-146d may be implemented as a bank of memory. In general, each memory bank 146a-146d may be arranged as multiple pages, each page corresponding to an addressable row. Each page may be subdivided into multiple addressable columns. Each of the columns may represent a smallest addressable unit of memory (e.g., a bit, a byte, a 16-bit word, a 32-bit word, etc.). In the illustrated embodiment, each column accesses a byte of data. Each byte of data may store a chrominance sample or a luminance sample for a single pixel. In the illustrated embodiment, each of the four memory banks 146a-146d may be arranged to store 32 pages with 4096 bytes (e.g., 4096 samples) per page for a total capacity of 512 kilobits. Other numbers of banks, pages per bank and/or samples per page may be implemented to meet the criteria of a particular application.

The block 148 may be implemented as a gating logic block. The gating logic block 148 may exchange data signals (e.g., Da-Dd) with each of the memory banks 146a-146d, respectively. Each of the data signals Da-Dd may be bidirectional with a direction based on an active read or write cycle. The particular memory block 146a-146d involved in each exchange may be determined by the column select signal C. The gating logic block 146 may exchange a data signal (e.g., E) with the blocks 150 and 154. The data signal E may also be bidirectional with a direction based on an active read or write cycle.

The block 150 may be implemented as a read latch block. The read latch block 150 may store a read value received from the gating logic block 148 via the data signal E during a read cycle. The read latch block 150 may generate another data signal (e.g., F) to present the stored read value to the block 152.

The block 152 may be implemented as a driver block. The driver block 152 may be operational to drive the read value from the data signal F out of the external memory circuit 140 in the signal DATA during a read cycle. During a write cycle, the driver block 152 may generate a data signal (e.g., G) based on a write value received in the signal DATA.

The block 154 may be implemented as a write first-in-first-out (FIFO) block. The write FIFO block 154 may buffer the write value received via the data signal G until the appropriate memory bank 146a-146d is ready to store the value. The write FIFO block 154 may present the write value to the gating logic block 148 in the data signal E. The gating logic block 148 may present the write value to the appropriate memory block 146a-146d based on the column select signal C.

Figure 6:
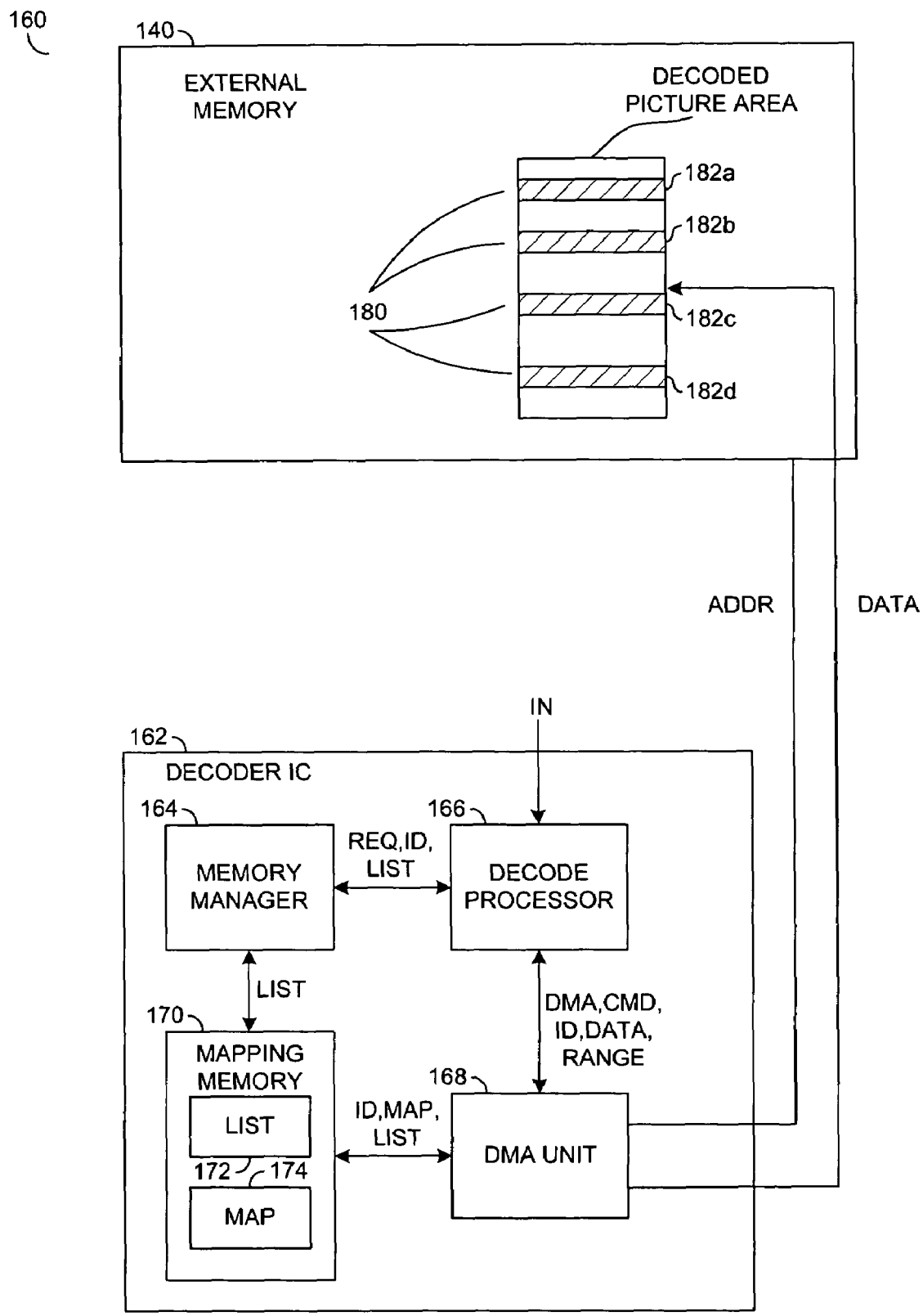
FIG. 6 is a block diagram of an example implementation of a device in accordance with a preferred embodiment of the present invention.

Referring to FIG. 6, a block diagram of an example implementation of a device 160 in shown in accordance with a preferred embodiment of the present invention. The device (or apparatus) 100 generally comprises the external memory circuit 140 and a circuit (or block) 162. The circuit 162 may be implemented as a decoder circuit. The decoder circuit 162 may be fabricated as a first integrated circuit. The external memory circuit 140 may be fabricated as a second integrated circuit, independently of the first integrated circuit. The decoder circuit 162 may be operational to generate the signal ADDR. The decoder circuit 162 may write and read the signal DATA to and from the external memory circuit 140. The decoder circuit 162 may be implemented using a field programmable gate array (FPGA), an application specific integrated circuit (ASIC), an application specific standard product (ASSP), or similar technology.

The decoder circuit 162 generally comprises a block (or module) 164, a block (or module) 166, a block (or module) 168 and a block (or module) 170. The block 168 may communicate with the external memory circuit 140 via the signals ADDR and DATA. A signal (e.g., IN) may be received by the block 166. The signal IN may be a compressed video signal to be decoded by the decoder circuit 162.

The block 168 may be implemented as a direct memory access (DMA) unit (or controller). The DMA unit 168 may be implemented using special purpose circuits. The DMA unit 168 may be in communication with the block 166, the block 170 and the external memory circuit 140.

The block 170 may be implemented as a local (or on-chip) memory, also referred to as a mapping memory. The mapping memory 170 may be implemented as a static random-access memory (SRAM). Other memory technologies may be used to meet the criteria of a particular application. The mapping memory 170 may be in communication with the block 164 and the DMA unit 168.

The block 164 may be implemented as a memory manager. The memory manager 164 is generally used to allocate/free picture segments to/from images (pictures). The memory manager 164 may be implemented as a software module running on a general-purpose processor. The picture segments may be managed by the memory manager 164 as a stack.

To allocate space in the external memory circuit 140 for an image, the memory manager 164 may (i) allocate enough picture segments to store the entire image, mark the allocated picture segments as "used" and (iii) generate a data structure that may be used to map pixel locations in the image to physical memory addresses in the external memory circuit 140. When an image may be discarded, the memory manager 164 may mark the picture segments associated with the discarded image as "unused" or "free". Therefore, a small picture or image may be mapped to a few picture segments and a large image may be mapped many picture segments. For example, in an H.264 level 4 decoder, a total amount of the external memory circuit 140 used for decoding may only be slightly higher than 12,288 KBytes. In practice, slightly more memory may be consumed because images may not use an integer number of the picture segments. However, far less memory may be used with a decoder in accordance with the present invention than with a conventional decoder.

A tradeoff generally exists in choosing a size of each picture segment. A small picture segment size may mean less waste of memory because an image is more likely to be multiples of the picture segment size. A large picture size may mean that the data structure used to map the picture segments to pixels may be smaller because each image generally consists of fewer picture segments.

The block 166 may be implemented as a decode processor. The decode processor 166 may be implemented as a combination of special purpose image decoding circuits and one or more general purpose processors with related software. In one embodiment, a single general purpose processor may be used for both the decode processor 166 and the memory manager 164.

The decode processor 166 may be in communication with the memory manager 164 and the DMA unit 168. The decode processor 166 may be operational to generate a list that associates a number of picture segments with the banks and pages of the external memory circuit 140. The list may be transferred in a signal (e.g., LIST) to the mapping memory 170 for storage in a file 172.

When the decode processor 166 issues a signal (e.g., REQ) requesting memory for an image 180 received via the signal IN, the memory manager 164 may find an appropriate number of free picture segments 182a-182d and generate a mapping recording an allocation between the pixels in the image 180 and the free picture segments 182a-182d. The picture segments 182a-182d may then be marked as "used". The memory manager 164 may provide the decode processor 166 with a signal (e.g., ID) conveying an identification for the space in the external memory circuit 140 that the image 180 occupies. The mapping may be transferred to the mapping memory 170 in a signal (e.g., MAP) for storage in a file 174, which also stores the identification value for the image.

When the decode processor 166 issues a DMA command signal (e.g., DMA_CMD) to the DMA unit 168, the decode processor 166 may present the signal ID for the image 182 and a signal (e.g., RANGE) conveying a range of pixels to the DMA unit 168 to store/load to/from the external memory circuit 140. The DMA unit 168 generally uses (i) the signal ID, (ii) the signal RANGE, (iii) the mapping as stored in the mapping memory 170 and (iv) the method use to tilize the image 180 to compute the correct physical addresses to use in the signal ADDR for a DMA operation. The DMA operation may move the tilized image 180 between the external memory circuit 140 and the decoder circuit 162. The image 180 may be stored in the external memory circuit 140 in the non-contiguous picture segments 182a-182d. The memory mapping stored in the decoder circuit 162 may be used to translate between sample (e.g., pixel) locations and physical addresses.

When the decode processor 166 is finished with an image, the decode processor 166 may give the identification value back to the memory manager 164. The memory manager 164 generally marks all of the picture segments used for the discarded image as "unused". The identification value is thus free for reuse with another image.

The present invention generally uses a virtual tilized memory for a video decoder that may operate on a bit-stream having images of different sizes. As the size of the images change, different numbers of picture segments may be allocated to map the various images into the physical address space of the external memory circuit 140. The present invention may also be used for any image processing applications where tilized storage improves performance and the number and size of image buffers used varies over time.

While the invention has been particularly shown and described with reference to the preferred embodiments thereof, it will be understood by those skilled in the art that various changes in form and details may be made without departing from the spirit and scope of the invention.

The invention claimed is:

1. A device comprising:
   a decode processor configured to (i) divide a first picture from a video signal into a plurality of picture segments, (ii) divide each one of said picture segments into a plurality of tiles and (iii) generate a list associating each one of said tiles to a corresponding one page of a plurality of pages in a corresponding one bank of a plurality of banks in a first memory such that each one of said picture segments has (a) at least a first one of said tiles associated with a first of said banks and (b) at least a second one of said tiles associated with a second of said banks;
   a direct memory access unit configured to store said first picture in said first memory according to said list; and
   a memory manager configured to (i) generate a map allocating space in said first memory to store said first picture and (ii) transfer an identification value identifying said map to said decode processor, wherein (a) said decode processor is further configured to transfer said identification value to said direct memory access unit and (b) said direct memory access unit is further configured to use said identification value to locate said map.

2. The device according to claim 1, further comprising a second memory configured to (i) store said list and (ii) transfer said list to said direct memory access unit.

3. The device according to claim 1, wherein said memory manager stores said map in a second memory.

4. The device according to claim 3, wherein said direct memory access unit uses said identification value to locate said map in said second memory.

5. The device according to claim 1, wherein each one of said picture segments comprises four of said tiles spatially arranged to share a common corner.

6. The device according to claim 1, wherein each of said picture segments is mapped to at least four of said banks in said first memory.

7. The device according to claim 1, wherein said picture segments of said first picture are stored in a plurality of physically non-contiguous address ranges in said first memory.

8. The device according to claim 1, wherein each of said picture segments comprises one group of a plurality of luminance samples and a plurality of chrominance samples from said first picture.

9. The device according to claim 1, wherein said tiles comprise a plurality of spatially square regions.

10. The device according to claim 1, wherein said picture segments comprise a plurality of spatially square regions.

11. A method of storing a video signal, comprising the steps of:
    (A) dividing a first picture from said video signal into a plurality of picture segments;
    (B) dividing each one of said picture segments into a plurality of tiles;
    (C) generating a list associating each one of said tiles to a corresponding one page of a plurality of pages in a corresponding one bank of a plurality of banks in a memory such that each one of said picture segments has (a) at least a first one of said tiles associated with a first of said banks and (b) at least a second one of said tiles associated with a second of said banks;
    (D) storing said first picture in said memory according to said list;
    (E) generating a map in a memory manager allocating space in said memory to store said first picture;
    (F) transferring an identification value identifying said map from said memory manager to a decode processor;
    (G) transferring said identification value from said decode processor to a direct memory access unit; and
    (H) locating said map with said direct memory access unit using said identification value.

12. The method according to claim 11, wherein step (D) comprises the sub-step of:
    storing said first picture using a plurality of direct memory access operations.

13. The method according to claim 11, further comprising the step of:
    marking a plurality of memory segments in said memory that have been allocated to said first picture as used.

14. The method according to claim 11, further comprising the step of:
    deallocating said memory segments from said first picture to free space in said memory.

15. The method according to claim 14, further comprising the step of:
    marking said memory segments deallocated from said first picture as free.

16. The method according to claim 14, further comprising the step of:
    mapping a second picture from said video signal to said memory segments including at least one of said memory segments deallocated from said first picture.

17. The method according to claim 16, wherein said first picture has a different size than said second picture.

18. The method according to claim 11, further comprising the step of:
    generating a value identifying which of a plurality of memory segments in said memory are mapped to said first picture.

19. The method according to claim 11, wherein each one of said picture segments is mapped to all of said banks in said memory.

20. A device comprising:
    means for (i) dividing a first picture from a video signal into a plurality of picture segments, (ii) dividing each one of said picture segments into a plurality of tiles and (iii) generating a list associating each one of said tiles to a corresponding one page of a plurality of pages in a corresponding one bank of a plurality of banks in a memory such that each one of said picture segments has (a) at least a first one of said tiles associated with a first of said banks and (b) at least a second one of said tiles associated with a second of said banks;
    means for storing said first picture in said memory according to said list; and
    means for (i) generating a map allocating space in said memory to store said first picture and (ii) transferring an identification value identifying said map to said means for dividing said first picture, wherein (a) said means for dividing said first picture transfers said identification value to said means for storing and (b) said means for storing uses said identification value to locate said map.

* * * * *